(12) United States Patent
Liu

(10) Patent No.: US 10,120,583 B2
(45) Date of Patent: Nov. 6, 2018

(54) PERFORMANCE PENALTY AVOIDANCE FOR SOLID STATE DRIVE

(71) Applicant: Facebook, Inc., Menlo Park, CA (US)

(72) Inventor: Song Liu, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 56 days.

(21) Appl. No.: 15/175,480

(22) Filed: Jun. 7, 2016

(65) Prior Publication Data

US 2017/0351428 A1  Dec. 7, 2017

(51) Int. Cl.
*G06F 3/06* (2006.01)
*G06F 17/30* (2006.01)

(52) U.S. Cl.
CPC ............ *G06F 3/061* (2013.01); *G06F 3/0638* (2013.01); *G06F 3/0679* (2013.01); *G06F 17/30218* (2013.01)

(58) Field of Classification Search
CPC ...... G06F 3/061; G06F 3/0652; G06F 3/0659; G06F 3/0688; G06F 3/0658; G06F 3/0661; G06F 3/0616; G06F 3/0638; G06F 3/064; G06F 3/0643; G06F 3/0679
See application file for complete search history.

(56) References Cited

U.S. PATENT DOCUMENTS

| 6,725,321 | B1 * | 4/2004 | Sinclair | G06F 3/0619 |
| | | | | 365/185.29 |
| 9,383,923 | B1 * | 7/2016 | Malina | G06F 3/0608 |
| 2003/0163594 | A1 * | 8/2003 | Aasheim | G06F 3/0619 |
| | | | | 719/310 |
| 2007/0143566 | A1 * | 6/2007 | Gorobets | G06F 12/0292 |
| | | | | 711/202 |
| 2007/0274150 | A1 * | 11/2007 | Gorobets | G06F 3/0625 |
| | | | | 365/230.03 |
| 2011/0060887 | A1 * | 3/2011 | Thatcher | G06F 3/0604 |
| | | | | 711/171 |
| 2011/0202812 | A1 * | 8/2011 | Asano | G06F 11/1068 |
| | | | | 714/747 |
| 2012/0072680 | A1 * | 3/2012 | Kimura | G06F 11/108 |
| | | | | 711/154 |
| 2017/0124104 | A1 * | 5/2017 | Smith | G06F 17/30091 |

\* cited by examiner

*Primary Examiner* — Michael Krofcheck
(74) *Attorney, Agent, or Firm* — FisherBroyles, LLP

(57) ABSTRACT

Several embodiments include a host computer coupled to a solid state drive (SSD). The filesystem of the host computer can receive a write pointer from the firmware of the SSD. The write pointer can reference a next available page to an erase block in the SSD. In response to a file write request to store a target file, the filesystem can determine a logical address range to store at least a portion of the target file based on the file write request and the write pointer. The filesystem can then generate a sector write command to send to the SSD. The sector write command can specify the determined logical address range.

17 Claims, 7 Drawing Sheets

600 

```
┌─────────────────────────────────────────────────────────────────────┐
│ Tracking, via the firmware of a SSD, write pointers to corresponding next │
│            available pages of erase blocks in the SSD               │
│                              605                                    │
└─────────────────────────────────────────────────────────────────────┘
                                  │
┌─────────────────────────────────────────────────────────────────────┐
│ Providing, via the firmware, at least one of the write pointers to a filesystem of │
│         a host computer coupled to the solid state drive            │
│                              610                                    │
└─────────────────────────────────────────────────────────────────────┘
                                  │
┌─────────────────────────────────────────────────────────────────────┐
│ Track, via the filesystem of the host computer, states of sectors corresponding │
│     to pages in at least some of the erase blocks of the solid state drive │
│                              615                                    │
└─────────────────────────────────────────────────────────────────────┘
                                  │
┌─────────────────────────────────────────────────────────────────────┐
│   Track, via the filesystem, a state change of at least one of the erase blocks │
│                              620                                    │
└─────────────────────────────────────────────────────────────────────┘
                                  │
┌─────────────────────────────────────────────────────────────────────┐
│ Receive, by the filesystem from an application, a file write request to store a │
│                          target file                                │
│                              625                                    │
└─────────────────────────────────────────────────────────────────────┘
                                  │
┌─────────────────────────────────────────────────────────────────────┐
│ Select, by the filesystem and based on state information of the erase blocks and │
│   the file write request, one of the erase blocks as a destination for at least a │
│                      portion of the target file                     │
│                              630                                    │
└─────────────────────────────────────────────────────────────────────┘
                                  │
┌─────────────────────────────────────────────────────────────────────┐
│ Determine, by the filesystem, a logical address range to store the at least a │
│ portion of the target file based on the write pointer to the selected erase block │
│                              635                                    │
└─────────────────────────────────────────────────────────────────────┘
                                  │
┌─────────────────────────────────────────────────────────────────────┐
│ Generate, by the filesystem, a sector write command that specifies the │
│    determined logical address range to send to the solid state drive │
│                              640                                    │
└─────────────────────────────────────────────────────────────────────┘
```

*FIG. 6*

PERFORMANCE PENALTY AVOIDANCE FOR SOLID STATE DRIVE

BACKGROUND

Solid state drives (SSDs) (e.g., flash drives) are data storage devices that use storage integrated circuit (IC), namely solid state memory components, such as NAND Flash, assemblies as memory to store data. The solid state memory components may have a higher capacity than random access memories (RAM) and higher performance speed than hard disk drives (HDDs). However, the solid state memory components have some inherent limitations. For example, NAND Flash may be limited to operate on a block basis (e.g., erase blocks). That is, the solid state memory components commonly have different resolution capabilities with respect to read commands, write (program) commands, and delete (erase) commands. To serve arbitrary requests from host computer, an SSD firmware is required to operate the solid state memory components under these inherent limitations. For example, SSD firmware can read from NAND Flash on a per readable section basis, program (write) the NAND Flash on a per page basis, and erase data from the NAND Flash on a per erase block basis. A "readable section", a "page", and an "erase block" are all units of physical memory space, which correspond to the resolutions of the input/output (I/O) operations on the solid state memory components.

The size of a readable section, a page, and an erase block may vary from device to device. In some cases, a readable section is the same size as a page. In one example, a readable section is a smaller unit of memory space compared to a page, and a page is a smaller unit of memory space compared to an erase block. Each erase block in an SSD has a limited number of program/erase (P/E) cycles before it wears out physically. An erase block, once written, would then need to be entirely erased before any page in the erase block can be changed. That is, a physical page, once written with data, cannot be re-written until the entire erase block containing the physical page is deleted. Accordingly, file modification requests often trigger re-mapping operations in the SSD. A large number of program/erase operations would increase the latency when reading data from the SSDs. As part of garbage collection, a large number of read-modify-write operations may need to be performed to free enough spare pages and erase blocks. An increase in the number of read-modify-write operations in turn can increase the latency for the SSD. Because of these inherent limitations in a SSD, the full performance potential of SSDs remains unrealized.

A host computer can maintain a filesystem to keep track of data files stored in its SSDs. In a conventional data storage system, an SSD itself is not aware of data files it stores and the host computer is not aware of how the SSD controller is storing the data files. In this setup, the usage of the physical blocks is hidden from the host computer.

BRIEF DESCRIPTION OF THE DRAWINGS

FIG. 6 is a flow chart illustrating a method of operating a data storage system with a solid state drive to avoid, on a filesystem level, I/O operations that cause latency delays, in accordance with various embodiments.

Figure 1:
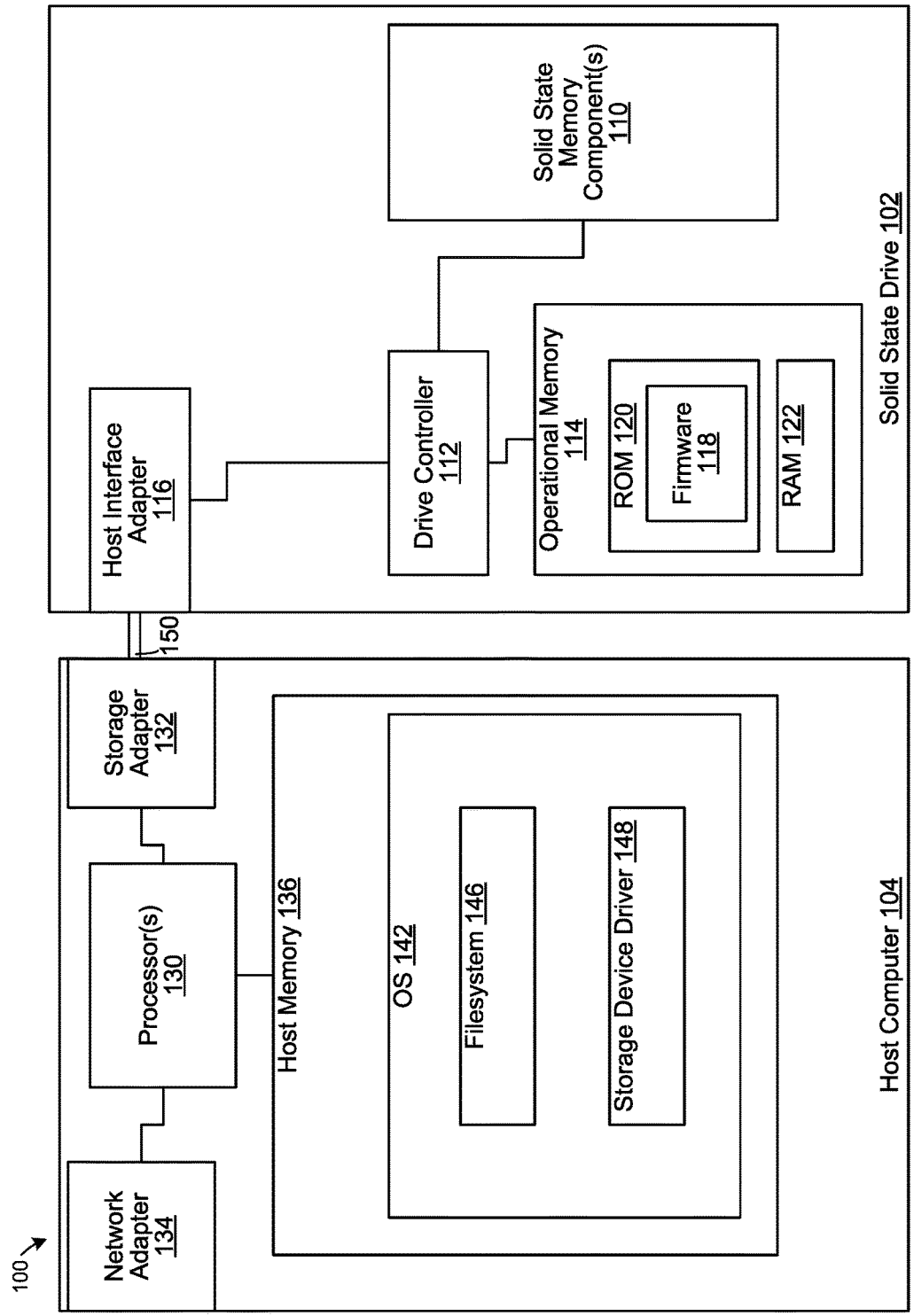
FIG. 1 is a block diagram illustrating a network environment for a data storage system utilizing at least a solid state drive, in accordance with various embodiments.

The figures depict various embodiments of this disclosure for purposes of illustration only. One skilled in the art will readily recognize from the following discussion that alternative embodiments of the structures and methods illustrated herein may be employed without departing from the principles of embodiments described herein.

DETAILED DESCRIPTION

Solid state memory components have different resolution limits associated with different types of data access operations. A write operation can have a higher resolution than an erase operation. An erase operation (e.g., an "erasure") deletes data in an "erase block" that may contain various "written pages" (e.g., a "written page" has the smallest possible data size for a write operation). Erasure of an erase block that contains a valid written page (e.g., not intended to be removed) is a complex process because it requires rewriting of all valid written pages (e.g., pages that are not deemed stale or corrupted) to a different erase block or an I/O buffer. The rewriting enables the SSD to retain the valid written pages despite erasure of the original erase block. Rewriting of an erase block may be part of the garbage collection operations. For example, if the SSD run out of spare erase blocks, the SSD can no longer service write requests from the host server before the garbage collection completes. In some embodiments, the latency of the rewrite operations is not exposed to the host. Frequent rewrites can exacerbate garbage collection, and hence introduce a latent performance penalty in the usage of the SSD. Rewrites in garbage collection also introduce extra writes to the memory components. Writing more data than requested by host computer is known as write amplification. Most solid state memory components have limited program/erase (P/E) cycles. Therefore, increase in write amplification has negative impact on the life time of the SSD.

Various embodiments include a method of exposing write pointers corresponding to next available pages in erase blocks of a SSD to a filesystem of a host computer coupled to the SSD. This exposure enables the host computer to make decisions on a write operation to avoid incurring a performance penalty (e.g., processing latency) and/or increasing write amplification. For example, the filesystem can execute various performance and/or life time optimization algorithms for each write operation by comparing the available space of each erase block to the data size of a target file to be written or by enforcing or enabling the write pointers as starting pointers of sector write commands to the SSD. If a host computer or a filesystem is not aware of states (e.g., a "full" state, an "in-use" state, an "empty state", a "has-garbage" state, or any combination thereof) of the erase blocks in the SSD, the filesystem would be unable to avoid operations that can exacerbate the performance and/or life time penalties caused by the restrictive limitations of the SSD. The disclosed data storage system enables the filesystem to receive physical memory space information from the firmware of the SSD. This enables the filesystem to avoid the performance and/or life time penalties by enforcing penalty avoidance or accounting for such penalties when generating I/O commands to the SSD.

Turning now to the figures, FIG. 1 is a block diagram illustrating a network environment for a data storage system 100 utilizing at least a solid state drive 102, in accordance with various embodiments. The data storage system 100 can include a host computer 104 that utilizes the solid state drive 102 for data storage. In some embodiments, the host computer 104 can be coupled to multiple solid state drives. In some embodiments, the solid state drive 102 can be coupled to multiple host computers.

The solid state drive 102 can include one or more solid state memory components 110, a drive controller 112, operational memory 114, a host interface adapter 116, or any combination thereof. The operational memory 114 can be configured to store firmware 118. The solid state memory components 110 can be volatile memory (e.g., dynamic random access memory (DRAM)), non-volatile memory (e.g., NAND flash or NOR flash), or a combination thereof. The solid state memory components 110 can take the form of IC chips. The solid state memory components 110 can include arrays or matrices of memory cells. The drive controller 112 can bridge the solid state memory components 110 and the host computer 104, enabling the host computer to store and retrieve data to/from the solid state drive 102. The operational memory 114 can store the executable instructions of the firmware 118. In some embodiments, the operational memory 114 includes both read-only memory (ROM) 120 and random access memory (RAM) 122.

The drive controller 112 can load the executable instructions of the firmware 118 from the ROM 120 to the RAM 122 for execution. In some embodiments, the drive controller 112 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The host computer 104 can include one or more processors 130, a storage adapter 132, a network adapter 134, and host memory 136. The processors 130 are the central processing units (CPUs) of the host computer 104. The processors 130 can control the overall operation of the host computer 104. In some embodiments, the processors 130 control the overall operation by executing software stored in the host memory 136.

The processors 130 can also be connected to the network adapter 134 and the storage adapter 132. The network adapter 134 can provide the host computer 104 with the ability to communicate with remote devices (e.g., one or more client devices that utilize the host computer 104 for application services or for storing data files), over a network (e.g., a local area network or a wide area network). For example, the network adapter 134 can be an Ethernet adapter, Infini Band adapter, or Fibre Channel adapter. The network adapter 134 may also provide the host computer 104 with the ability to communicate with other host computers (e.g., connected to the same local area network or share one or more data storage devices, such as the solid state drive 102). The storage adapter 132 can enable the host computer 104 to access a persistent storage (e.g., the solid state drive 102). An interconnect 150 can be coupled between the storage adapter 132 of the host computer 104 and the host interface adapter 116 of the solid state drive 102. For example, the interconnect 150 can be a small computer system interface (SCSI) cable, a serial Advanced Technology Attachment (ATA), a serial attached SCSI (SAS), a Peripheral Component Interconnect (PCI) express, a Fibre Channel, a Universal Serial Bus (USB), a parallel ATA, or any combination thereof.

In various embodiments, the host memory 136 is or includes the main memory of the host computer 104. The host memory 136 can include any form of random access memory (RAM), read-only memory (ROM), flash memory, or the like, or a combination of such devices. The host memory 136 can store logic components (e.g., bundles of executable instructions) operable when executed by the processor. For example, the logic components can include an operating system 142. The operating system 142 can include a filesystem 146 and a storage device driver 148. The filesystem 146 can implement track data files managed by the filesystem 146 and how these data files mapped to logical address ranges. These ranges can be referred to as "sectors." For example, the filesystem 146 can track the data files in a logical block addressing (LBA) table. The storage device driver 148 provides instructions and/or protocols for the filesystem 146 to communicate with the solid state drive 102 (e.g., the drive controller 112).

In various embodiments, the filesystem 146 and the firmware 118 can implement commands and corresponding responses that expose physical memory space information regarding the solid state drive 102 to the filesystem 146. In some embodiments, the filesystem 146 can also implement commands to the firmware 118 to enable the filesystem 146 to inform the firmware 118 of invalid pages or to command the firmware 118 to remove erase blocks. These commands and responses enable the data storage system 100 to implement a latency avoidance mechanism. Without the latency avoidance mechanism, the data storage system 100 would be unable to avoid the performance penalty caused by the restrictive limitations of the solid state memory components 110.

I/O Operations in a Solid State Drive

Typically, memory cells for a solid state drive are configured such that it is not possible to read or write single cells individually. These memory cells can be accessed (e.g., read, written, or erased) at different granularity depending on the I/O access type. In some embodiments, a solid state drive (e.g., the solid state drive 102) cannot be read for less than a single "page" at once. A page is the minimum granularity of memory space that can be written into the memory cells. For example, a request to read a single sector may require a full page to be retrieved from the solid state drive. In some embodiments, a preset byte size smaller than a page can be read from the solid state drive.

When writing to a solid state drive, write operations can be limited to a single "page". For example, if a write operation affects only one sector, a whole page will be written. Writing more data than necessary is known as "write amplification." Write amplification is an undesirable phenomenon associated with SSDs where the actual amount of physical information written is a multiple of the logical amount intended to be written.

A solid state drive can maintain different states for each of its pages. Each page can be written to, only if the page is in the "free" state. In some embodiments, when data is changed, the content of the page is copied into an internal buffer, and the data is updated and stored in another "free" page. This operation can be referred to as "read-modify-write." This operation can cause some immediate performance reduction and may cause latent performance reduction or life time penalty due to the increased complexity in garbage collection.

Because writes are aligned on the page size, any write operation that is not both aligned on the page size and a multiple of the page size will require more data to be written than necessary. In addition to writing more data than necessary, those writes also trigger more internal operations than necessary. For example, writing data in an unaligned way causes the pages to be read into cache before being modified and written back to the solid state drive. This unaligned writing is slower than directly writing pages to the solid state drive. This read-modify-write operation should be avoided whenever possible. In various embodiments, exposure of erase block information (e.g., write pointers to next available pages of the erase blocks) enables the filesystem of a host computer to avoid triggering the read-modify-write operations.

Avoid writing chunks of data that are below the size of a physical page can minimize write amplification and prevent read-modify-write operations. The filesystem, based on the exposed information from the firmware of the solid state drive, can align writes on the page size and write chunks of data that are multiple of the page size.

Figure 2A:
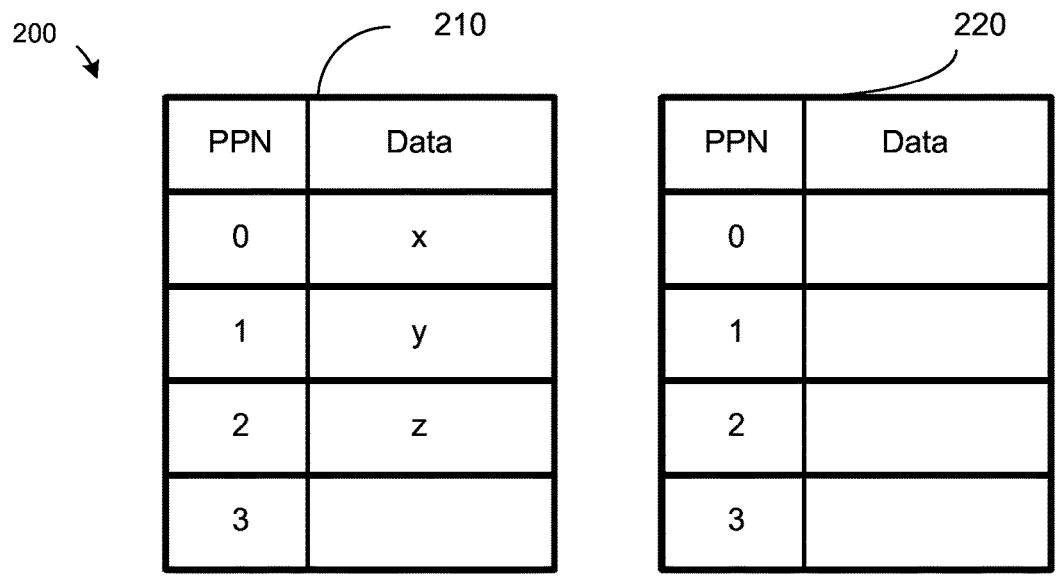
FIG. 2A is a data representation diagram illustrating an example of a part of a memory space provided by a solid state drive, in accordance with various embodiments.

FIG. 2A is a data representation diagram illustrating an example of a part of a memory space 200 provided by a solid state drive (e.g., the solid state drive 102), in accordance with various embodiments. Initially, an erase block 210 has three used pages respectively at physical page numbers (PPNs) of 0, 1, and 2. The erase block 210 has a free page at PPN of 3. An erase block 220 is entirely free.

Figure 2B:
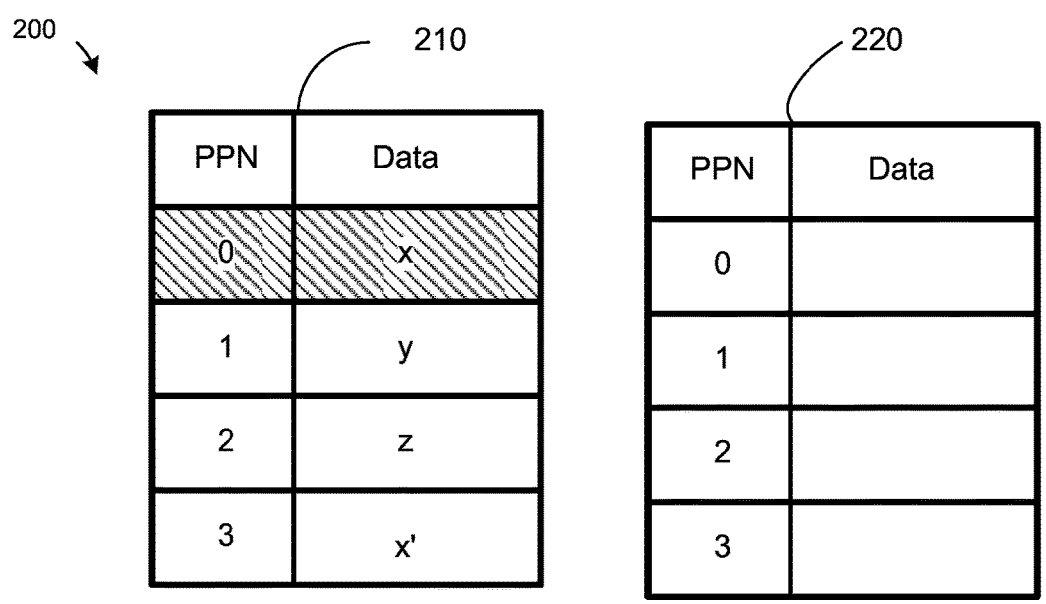
FIG. 2B is a data representation diagram illustrating the part of the memory space of FIG. 2A after performing a write operation on the solid state drive, in accordance with various embodiments.

FIG. 2B is a data representation diagram illustrating the part of the memory space 200 of FIG. 2A after performing a write operation on the solid state drive, in accordance with various embodiments. FIG. 2B illustrates that the data in the erase block 210 at PPN of 0 gets updated and becomes "x'". Because pages cannot be overwritten, the page (e.g., at PPN of 0) that contains "x" becomes stale/invalid, and the new version of the data is stored in a free page, at PPN of 3.

Figure 2C:
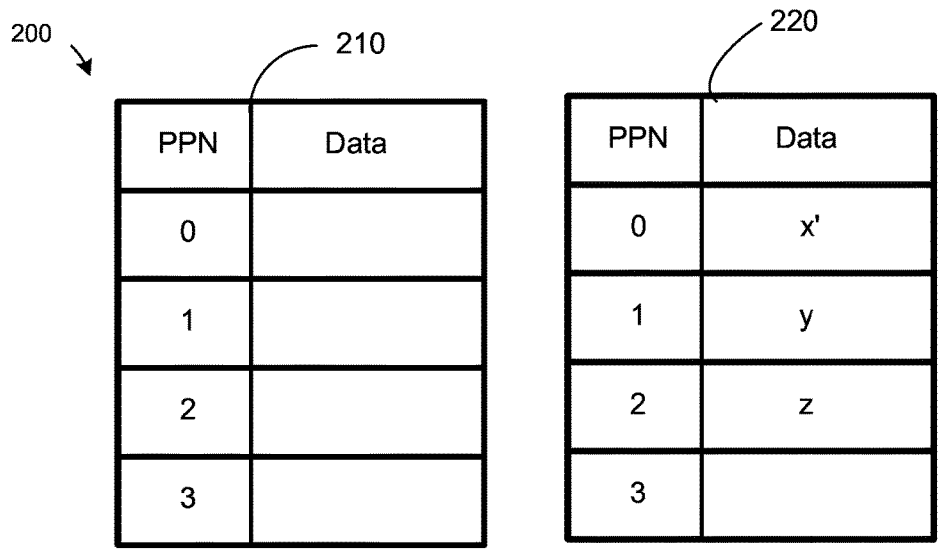
FIG. 2C is a data representation diagram illustrating the part of the memory space of FIG. 2B after performing garbage collection following the write operation, in accordance with various embodiments.

FIG. 2C is a data representation diagram illustrating the part of the memory space 200 of FIG. 2B after performing garbage collection following the write operation, in accordance with various embodiments. The garbage collection process copies on the valid pages from the erase block 210 into the erase block 220 (e.g., the erase block that is empty), leaving behind the invalid/stale pages. The erase block 210 is erased, which makes it ready to receive new write operations.

Figure 3:
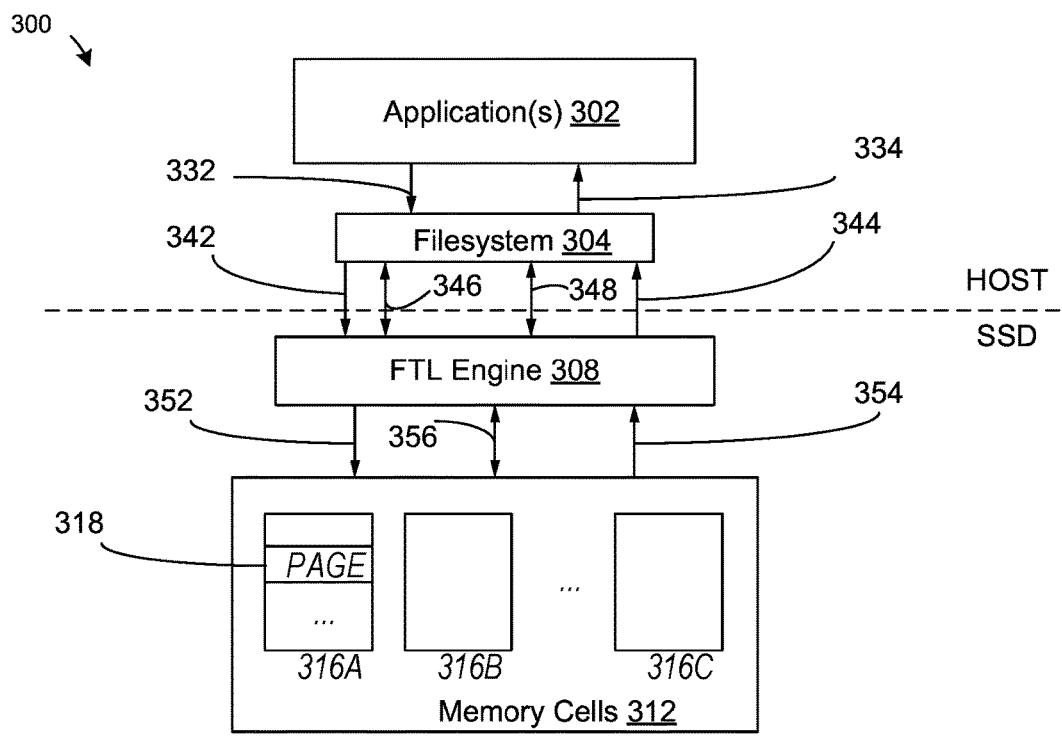
FIG. 3 is a block diagram of logic components in a data storage system for managing file storage in a solid state drive, in accordance with various embodiments.

FIG. 3 is a block diagram of logic components in a data storage system 300 (e.g., the data storage system 100) for managing file storage in a solid state drive (e.g., the solid state drive 102), in accordance with various embodiments. The data storage system 300 can include one or more applications 302 that produces file I/O commands (e.g., file reading commands, file writing comments, file modification commands, file removal commands, or any combination thereof) to a filesystem 304. The applications 302 and the filesystem 304 can be implemented on an operating system of a host computer (e.g., the host computer 104). In one example, one of the applications 302 can send a write request 332 to the filesystem 304 to store a target file. In another example, one of the applications 302 can send a read request 334 to the filesystem 304, and the filesystem 304 can respond with the requested file back to the requesting application. The illustrated arrows representing the read request 334 and the write request 332 can correspond to the direction that the request payload is delivered.

The filesystem 304 manages data storage in terms of variable length data files. For example, the applications 302 can specify file identifiers in the file I/O requests. The filesystem 304 can translate the file I/O requests into data storage I/O commands (e.g., logical sector write commands 342 or logical sector read commands 344). The data storage I/O commands can specify logical address ranges. The illustrated arrows representing the logical sector write commands 342 and the logical sector read commands 344 can correspond to the direction that the payload (if any) associated with the commands are delivered. In various embodiments, unlike conventional filesystems, the filesystem 304 can also issue erase block reset commands 346 and erase block query commands 348.

The data storage system 300 can include a flash translation layer (FTL) engine 308. In some embodiments, the FTL engine 308 is part of the firmware (e.g., firmware 118) of the solid state drive in the data storage system 300. In some embodiments, the FTL engine 308 resides in the host computer. The FTL engine 308 can provide the address mapping from the logical address space (e.g., known to the host computer) to the physical address space (e.g., known to the solid state drive). In various embodiments, the FTL engine 308 can also expose at least some physical address space information to the filesystem 304 to enable the filesystem 304 to run performance/efficiency optimization algorithms when storing data files in the solid state drive.

The FTL engine 308 can communicate with the filesystem 304 and with solid state memory cells 312. For example, the solid state memory cells 312 can provide physical data storage space in units of erase blocks (e.g., an erase block 316A, an erase block 316B, an erase block 316C, etc.). Each of the erase blocks can store multiple data pages (e.g., a data page 318). The FTL engine 308 can execute page program operations 352 (e.g., write data), page read operations 354 (e.g., retrieve data), and block erase operations 356 (e.g., delete data in one or more erase blocks). The illustrated arrows representing the page write operations 352 and the page read operations 354 can correspond to the direction that the payload associated with the operations are delivered.

In various embodiments, the applications 302 can send requests to the filesystem 304 to save target files into the solid state memory cells 312. The FTL engine 308 can track current states of erase blocks and current states of pages in the erase blocks. The FTL engine 308 can report information derived from the tracked states to the filesystem 304. In turn, the filesystem 304 can use the reported information to determine where to write the target files.

In various embodiments, the filesystem 304 can utilize the write pointers to determine available memory space in each erase block. In some embodiments, the filesystem 304 can utilize that information to enforce sequential writing in erase blocks. In some embodiments, the filesystem 304 can utilize the information determine whether to enforce sequential writing. In some embodiments, the filesystem 304 can utilize the information to control the number of in-use erase blocks. In these embodiments, the enforcement or preference of sequential writing into the erase blocks can substantially decrease the latency of garbage collection by the FTL engine 308.

In various embodiments, the FTL engine 308 and the filesystem 304 can implement a host-side latency avoidance mechanism (e.g., for optimizing the performance speed and/or storage efficiency of the solid state drive 102). Conventional solid state storage systems typically rely solely on firmware of a solid state drive to take care of page write operations, block erase operations, and page read operations, in response to sector read command and sector write command from a conventional filesystem. In various embodiments, the FTL engine 308 can expose information regarding the states of the erase blocks to the filesystem 304. In some embodiments, this enables the filesystem 304 or the applications 302 to make decisions based on different performance/efficiency optimization algorithms (e.g., a static algorithm or a dynamic algorithm that changes based on real-time needs of the applications 302 and/or state of the solid state memory cells 312). A performance/efficiency optimization algorithm can enable the filesystem 304 and the FTL engine 308 to enforce latency avoidance rules that improves the service performance and/or storage efficiency of the solid state drive 102. Different performance/efficiency optimization algorithms or configurations of a performance/efficiency optimization algorithm can balance service performance and storage efficiency differently.

In various embodiments, the FTL engine 308 can provide logical address ranges corresponding to erase blocks to the filesystem 304. In some embodiments, the FTL engine 308 can provide the logical address ranges in response to a query command from the filesystem 304. In some embodiments, the FTL engine 308 can provide the logical address ranges periodically or according to a preset schedule. The FTL engine 308 can also provide write pointers to the erase blocks of the solid state drive. In some embodiments, the FTL engine 308 can provide the write pointers in response to a query command from the filesystem 304. In some embodiments, the FTL engine 308 can provide the write pointers to the filesystem 304 periodically or according to a preset schedule. These write pointers can reference a logical address corresponding to a next available page for writing. The FTL engine 308 can track the write pointers for sequential writing into the erase blocks. Based on this information, the filesystem 304 can control the life cycle of the erase blocks. In some embodiments, the filesystem 304 treats the write pointers as recommended locations for data storage. In these embodiments, the filesystem 304 or the applications 302 can further analyze the information regarding the erase blocks determine whether to store data in the write pointers. For example, the filesystem 304 can utilize the write pointers and the logical address ranges to determine available spaces in the erase blocks, and select the write pointer and the corresponding erase block as the destination of a write command that makes the best balance of storage efficiency and service performance according to the performance/efficiency optimization algorithm. In some embodiments, the filesystem 304 treats the write pointers as required locations for data storage. In some embodiments, the filesystem 304 can inform the FTL engine 308 regarding which readable sections, pages, and/or erase blocks are in use and which readable sections, pages, and/or erase blocks are not in use (e.g., "unwritten"). In some embodiments, the filesystem 304 can command the FTL engine 308 to remove an erase block. For example, when the pages in an erase block are all invalid, the filesystem can send a command to remove the erase block.

The disclosed host-side latency avoidance mechanism can enable file storage optimization that is otherwise unavailable in conventional data storage systems with solid state drives. Based on analysis of the exposed write pointers, the filesystem 304 of the host computer 104 can decrease the latency associated by avoiding high latency/performance penalty situations. In some embodiments, the host-side latency avoidance mechanism requires minimal interface change between the FTL engine 308 and the filesystem 304. For example, to implement the host-side latency avoidance mechanism, the read and write commands between the filesystem 304 and the FTL engine 308 are not changed from conventional formats and/or protocols.

It is difficult for solid state drives to optimize for performance without the ability to inform the applications 302 and/or the filesystem 304 how to avoid high penalty operations (e.g., page modification operation and/or garbage generating operation). In various embodiments, the FTL engine 308 exposes erase block information to the filesystem 304 to enable the host computer 104 to optimize data storage utilizing both sequential writing requirement information and erase block usage information. In some embodiments, the filesystem 304 can detect whether a write command would incur performance penalty and reschedule the write command if it does incur performance penalty. In some embodiments, the filesystem 304 can modify a write command to avoid incurring performance penalty. In some embodiments, the filesystem 304 can enforce or enable sequential writing in each erase block to minimize performance penalty and write amplification.

In various embodiments, the filesystem 304 and the FTL engine 308 are configured to support erase block information query commands from the filesystem 304 to the FTL engine 308. In these embodiments, the FTL engine 308 is configured to respond to the erase block query commands with information (e.g., erase block size, the erase block starting point, erase block state, write pointer, etc.) of its erase blocks, individually or in batches. The erase block starting point and the write pointer to an erase block can each be expressed as a logical address (e.g., logical block address) or a physical address (e.g., physical block address). In various embodiments, the filesystem 304 and the FTL engine 308 are configured to support erase block reset commands or page reset commands. For example, by issuing an erase block reset command, the filesystem 304 can cause the FTL engine 308 to reset the write pointer of an erase block back to the starting pointer of the erase block (e.g., making the erase block available and empty). By issuing a page reset command, the filesystem 304 can inform the FTL engine 308 that a page is no longer valid, and thus enable the FTL engine 308 to perform garbage collection on the invalid page thereafter.

Figure 4:
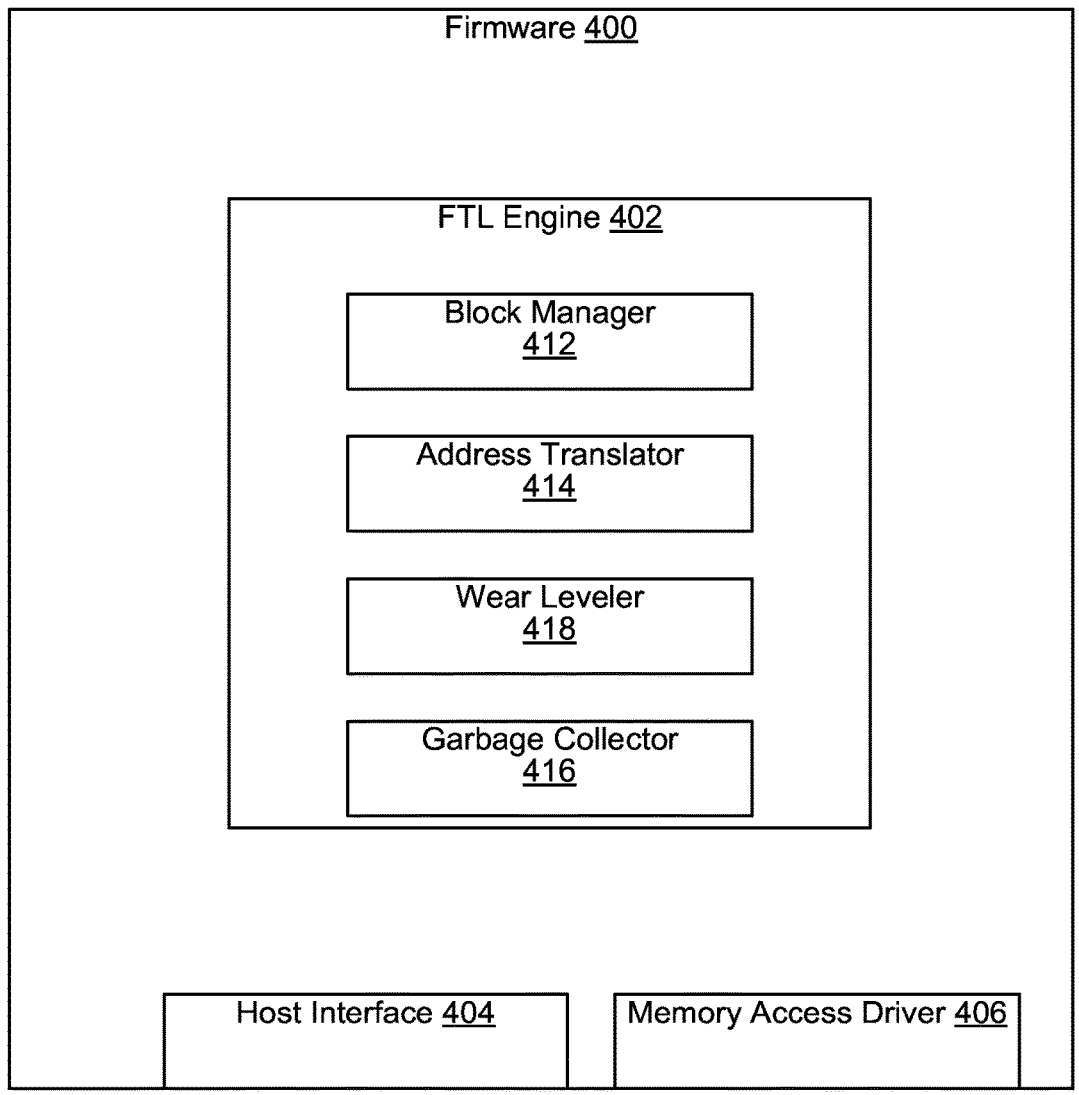
FIG. 4 is a block diagram illustrating logic components of firmware of a solid state drive, in accordance with various embodiments.

FIG. 4 is a block diagram illustrating logic components of firmware 400 (e.g., the firmware 118) of a solid state drive (e.g., the solid state drive 102), in accordance with various embodiments. The firmware 400 can include a FTL engine 402 (e.g., the FTL engine 308), a host interface 404, and a memory access driver 406. The FTL engine 402 can include a block manager 412, an address translator 414, a garbage collector 416, and a wear leveler 418.

The host interface 404 can be configured to provide a block device application programming interface (API) to a filesystem (e.g., the filesystem 304). For example, the host interface 404 can enable the filesystem to format the solid state drive. The host interface 404 can communicate with a storage device driver (e.g., the storage device driver 148) on the host computer of the solid state drive. The host interface 404 enables the firmware 400 to interpret commands from the filesystem and to send properly formatted responses to such commands.

The memory access driver 406 can be configured to translate I/O operations from the firmware 400 to the memory cells of the solid-state drive. The memory access driver 406 can be configured to interpret interrupt messages from the memory cells to be processed by the firmware 400.

The block manager 412 can provide block management of the physical memory space provided by the memory cells of the solid-state drive. For example, the block manager 412 can provide error handling of corrupted or invalid erase blocks. In various embodiments, the block manager 412 can track state information associated with erase blocks in the memory cells. For example, the state information can include a starting pointer of an erase block, the size of the erase block, a write pointer of the erase block, a current state (e.g., empty, in-use, or invalid), or any combination thereof. The state information can also include the state information of pages in the erase block. The state information of the pages can include whether a page is available to be written, whether the page is in use, whether the page is invalid, or any combination thereof. The block manager 412 can provide the state information of the erase blocks and/or its pages to the filesystem of the host computer.

The address translator 414 can maintain a mapping between logical address space and physical address space. The address translator 414 can translate between a logical memory address (e.g., logical block address or logical page address) and a physical address (e.g., physical block address or physical page address). In some embodiments, communication between the filesystem and the firmware 400 can reference only the logical address space. In these embodiments, the address translator 414 can provide corresponding logical address ranges of the erase blocks to the filesystem such that at least some characteristics associated with the physical memory can be exposed to the filesystem.

The garbage collector 416 can evacuate zones in the erase blocks of the memory cells for reuse. In some embodiments, a zone is measured in units of one or more erase blocks. In some embodiments, a zone can comprise one or more sequential pages of one or more erase blocks. For example, the garbage collector 416 can copy valid data from a source erase block to another open zone, issue erase command to the erase block, and set the state of the erase block to the available state (reset write pointer to the beginning of the erase block). In various embodiments, the exposure of erase block information from the firmware 400 to the filesystem enables the host computer to write data in a way that increases the performance and efficiency of the garbage collector 416.

The wear leveler 418 enables the firmware 400 to manage wear leveling of the memory cells of the solid state drive. Memory cells of solid state drives have a limited lifespan due to their limited number of program/erase (P/E) cycles. An erase block can exceed its P/E cycle limit, wear off, and the wear leveler 418 would mark it as being unusable. The wear leveler 418 can distribute P/E cycles as evenly as possible among the erase blocks. In order to achieve the best overall wear leveling, the wear leveler 418 can select erase blocks judiciously when writing, and may have to move around some erase blocks, a process which in itself incurs an increase of the write amplification. In some embodiments, block management is a trade-off between maximizing wear leveling and minimizing write amplification.

In various embodiments, the filesystem of the host computer coupled to the solid state drive can modify its logical sector write commands to facilitate garbage collection without actually been involved in the mechanism of garbage collection. In some embodiments, a portion of physical memory information associated with erase blocks is exposed to the filesystem. In some embodiments, the P/E cycle counts of the erase blocks can be exposed to the filesystem as well. For example, with P/E cycle information, the filesystem can decide which erase block to write to, for better wear-leveling. This is useful when the filesystem has multiple devices to write to. In some embodiments, even without deletion, data on the erase block needs to be rewritten periodically. In some embodiments, the data retention time of each erase block can be also exposed to the filesystem. Retention time is the time before an erase block need to be rewritten. Given the retention time information, the filesystem can write data that expiring soon (e.g., journal, etc.) to erase blocks with shorter retention time.

Functional/logical components (e.g., applications, engines, modules, and interfaces) associated with the data storage system 100, the data storage system 300, and the firmware 400 can be implemented as circuitry, firmware, software, or other functional and executable instructions. For example, the functional/logical components can be implemented in the form of special-purpose circuitry, in the form of one or more appropriately programmed processors, a single board chip, a field programmable gate array, a network-capable computing device, a virtual machine, a cloud computing environment, or any combination thereof. For example, the functional/logical components described can be implemented as instructions on a tangible storage memory capable of being executed by a processor or other integrated circuit chip. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Each of the functional/logical components may operate individually and independently of other functional/logical components. Some or all of the functional/logical components may be executed on the same host device or on separate devices. The separate devices can be coupled through one or more communication channels (e.g., wireless or wired channel) to coordinate their operations. Some or all of the functional/logical components may be combined as one component. A single functional/logical component may be divided into sub-components, each sub-component performing separate method step or method steps of the single component.

In some embodiments, at least some of the functional/logical components share access to a memory space. For example, one functional/logical component may access data accessed by or transformed by another functional/logical component. The functional/logical components may be considered "coupled" to one another if they share a physical connection or a virtual connection, directly or indirectly, allowing data accessed or modified by one functional/logical component to be accessed in another functional/logical component. In some embodiments, at least some of the functional/logical components can be upgraded or modified remotely (e.g., by reconfiguring executable instructions that implements a portion of the functional/logical components).

The systems, engines, or devices described may include additional, fewer, or different functional/logical components for various applications.

Figure 5:
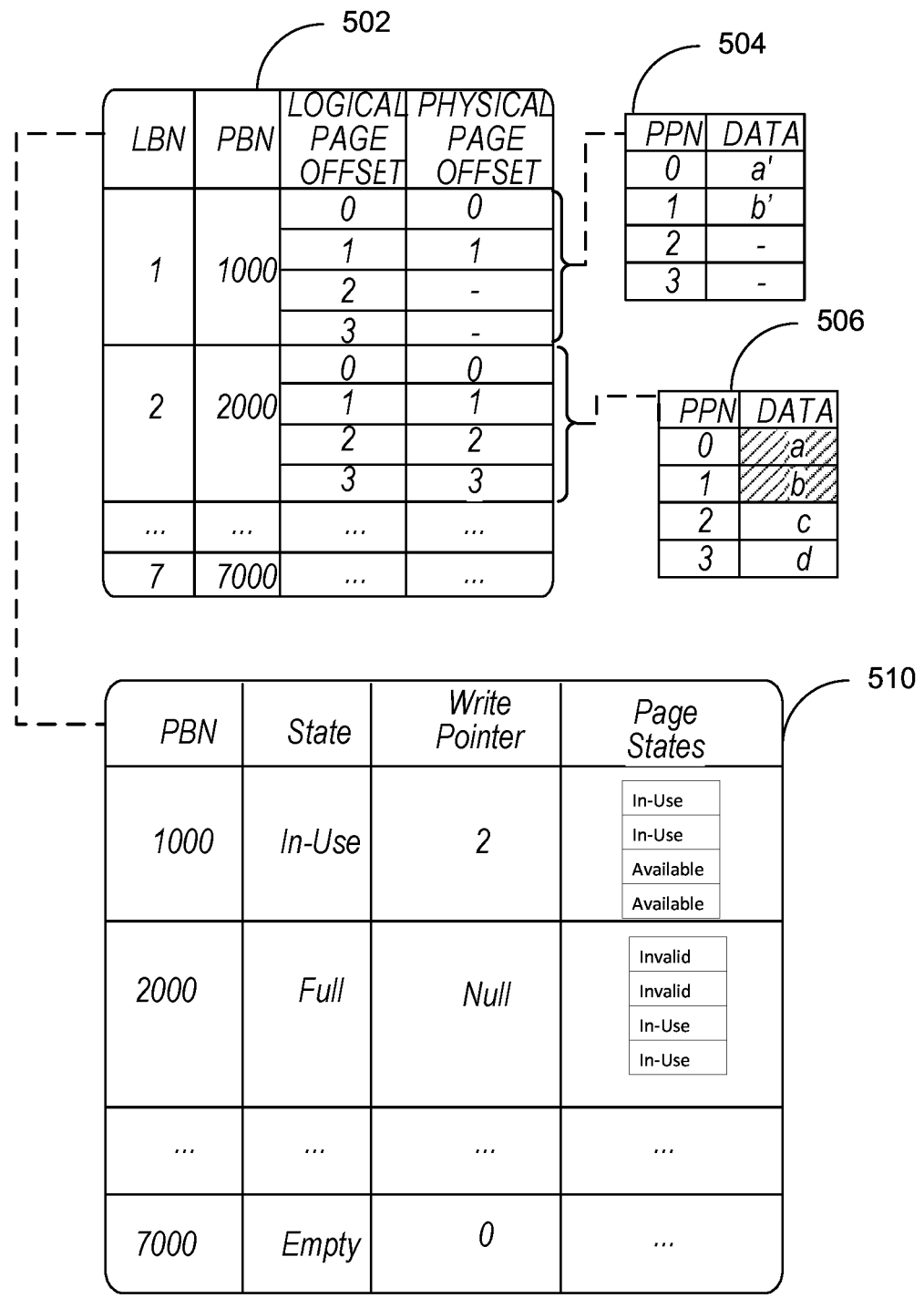
FIG. 5 is a block diagram illustrating an example of a part of a memory space managed by a filesystem of a host computer and firmware of a solid state drive, in accordance with various embodiments.

FIG. 5 is a block diagram illustrating an example of a part of a memory space managed by a filesystem (e.g., the filesystem 146) of a host computer (e.g., the host computer 104) and firmware (e.g., the firmware 118) of a solid state drive (e.g., the solid state drive 102), in accordance with various embodiments. A FTL engine (e.g., the FTL engine 402) of the solid state drive can maintain a block mapping table 502. For example, the block mapping table 502 can translate logical block addresses to physical block addresses and vice versa. In the illustrated example, the block mapping table 502 can translate between logical block numbers (LBNs) and physical block addresses (PBNs). In some embodiments where LBNs are different from logical block addresses, the filesystem (and/or other host software) can maintain an additional table (not shown) that translates between logical block addresses and LBNs. In the illustrated example, the block mapping table 502 can also translate between logical page offsets from LBNs and physical page offsets from the PBNs.

For example, a first erase block 504 is illustrated to store data in a physical page number (PPN) at 0 and a PPN at 1. A second erase block 506 is illustrated to store data in all four PPNs (e.g., 0-3). The first two pages of the second erase block 506 is shaded to illustrate that the data is therein is stale. This stale data can trigger garbage collection to occur.

The FTL engine also maintain a block state table 510 that keeps track of state information associated with erase blocks in the solid state drive. The block state table 510 can be updated in response to any I/O operations to the erase blocks. For example, the block state table 510 can specify a current state (e.g., in-use, full, or empty) of an erase block, a write pointer (for the next available page) of the erase block, and page states (e.g., in-use, available, or invalid/stale) of the erase block. For example, the page states of PBN 2000 illustrate that the first two physical blocks are "invalid" because the data is stale.

In various embodiments, at least a portion of the block state table 510 can be provided to the filesystem (e.g., upon request or according to a schedule). The exposure of the information in the block state table 510 enables the filesystem to avoid high penalty or high latency operations in the solid state drive.

FIG. 6 is a flow chart illustrating a method 600 of operating a data storage system with a solid state drive (e.g., the solid state drive 102) to avoid, on a filesystem level, I/O operations that cause latency delays, in accordance with various embodiments. A host computer can be coupled to the solid state drive. At block 605, the firmware of the solid state drive can track write pointers to corresponding next available pages of erase blocks in a solid state drive. For example, the firmware can track states of pages in the erase blocks and update the write pointers based on the tracked states of the pages. The next available page of an erase block can be determined by sequentially skipping in-use and invalid pages from a starting pointer of the erase block until an available page is reached. In some embodiments, the write pointers specify logical addresses that correspond to the next available pages in erase blocks, where the firmware tracks the next available pages in the physical memory address space.

At block 610, the firmware can provide at least one of the write pointers to the filesystem. For example, the firmware can provide at least one write pointer in response to query command for erase block information. In some embodiments, the query command specifies which erase block's information for the firmware to send. In some embodiments, the firmware can provide erase block information of a specified/preset portion of the erase blocks of the solid state drive. In some embodiments, the firmware can provide erase block information of all of the erase blocks of the solid state drive.

In some embodiments, at block 615, the filesystem tracks states of sectors in at least some of the erase blocks of the solid state drive. The sectors can be specified as logical address ranges and the logical address ranges can correspond to one or more pages in the erase blocks. The states of the sectors and hence the corresponding pages can be selected from potential states, including for example, an available state, an in-use state, and an invalid state. The available state indicates that a page is available for data storage. The in-use state indicates that a page is storing valid data. The invalid state indicates that a page is storing stale or incorrect data. The states of the sectors can be tracked based on the I/O commands issued from the filesystem to the firmware of the solid state drive.

At block 620, the filesystem can track a state change of at least one of the erase blocks based on the write pointers. The state change can specify a state from among various potential states for the erase block. For example, the potential states can include at least an empty state, an in-use state, and a full state. The empty state indicates that a write pointer associated with the erase block references a starting page of the erase block. The in-use state indicates that the write pointer references a page in the erase block other than the starting page. The full state indicates that the erase block has a null write pointer.

At block 625, the filesystem can receive a file write request to store a target file. For example, the filesystem can receive the file write request from an application running on an operating system of the host computer. At block 630, the filesystem can select, based on state information of the erase blocks and the file write request, one of the erase blocks as a destination for at least a portion of the target file.

At block 635, the filesystem can determine a logical address range to store at least a portion of the target file based on the write pointer to the selected erase block. The logical address range can start at the write pointer. In some embodiments, the filesystem can determine a potential performance penalty associated with writing the at least a portion of the target file to the erase block. The potential performance penalty can be increase if the logical address range does not start at the write pointer. Based on the potential performance penalty, the filesystem can determine whether to store the at least a portion of the target file in the erase block.

In one example, as part of determining the potential performance penalty, the filesystem can detect an inability to store the entirety of the target file into remaining available portion of the erase block. In another example, as part of determining the potential performance penalty, the filesystem can determine that storing the at least a portion of the target file causes write amplification. In yet another example, as part of determining the potential performance penalty, the filesystem can determine that storing at least a portion of the target file causes a read-modify-write operation at the solid state drive.

At block 640, the filesystem can generate a sector write command to send to the solid state drive. The sector write command can specify the determined logical address range.

Figure 7:
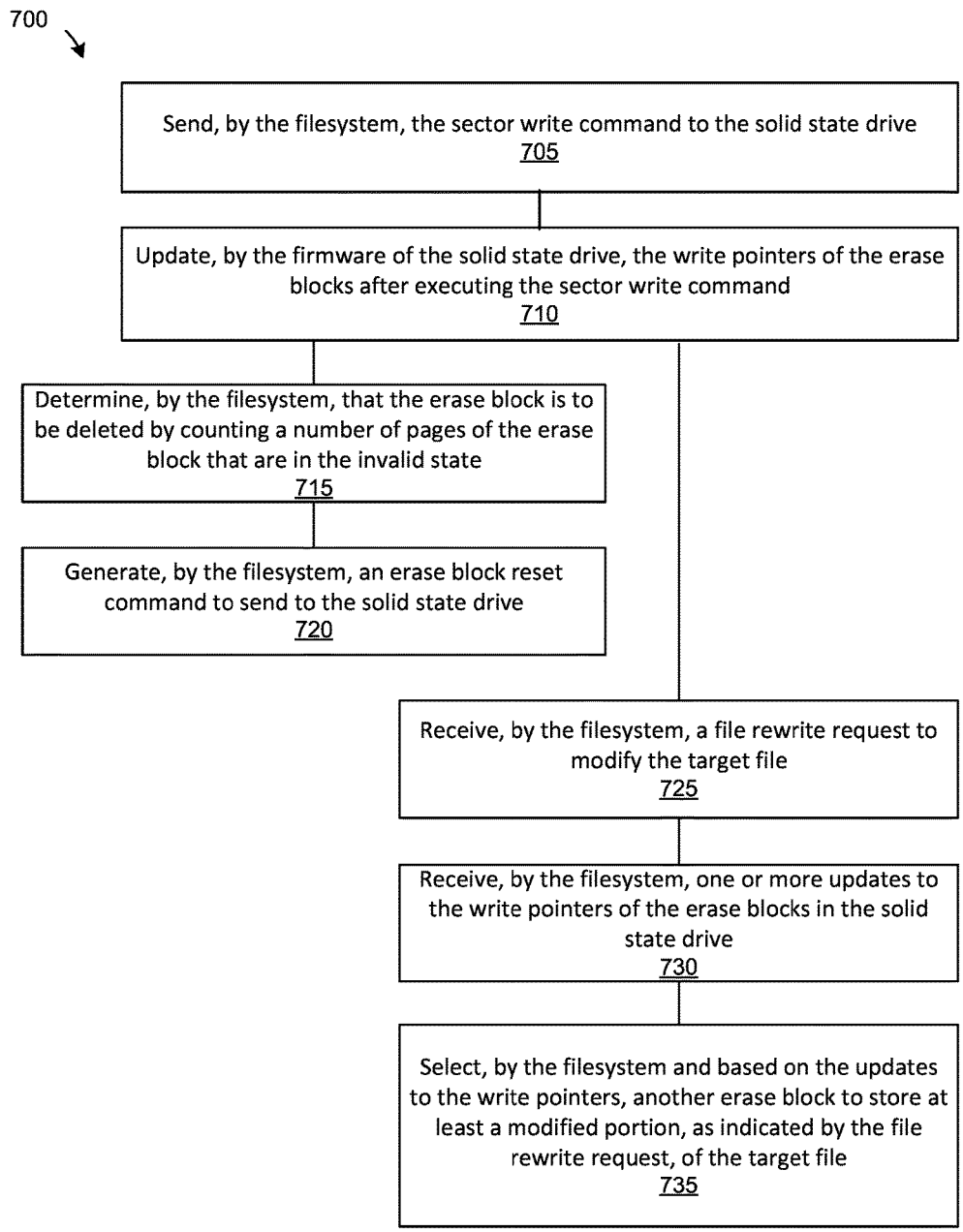
FIG. 7 is a flow chart illustrating a method of operating the data storage system following the method of FIG. 6, in accordance with various embodiments.

FIG. 7 is a flow chart illustrating a method 700 of operating the data storage system following the method 600 of FIG. 6, in accordance with various embodiments. Block 705 can follow after block 640 of FIG. 6. At block 705, the filesystem can send the sector write command to the solid state drive. In some embodiments, the filesystem can receive a command rejection responsive to the sector write command when the logical address range does not begin with one of write pointers to next available pages of erase blocks in the solid state drive. At block 710, the firmware can update the write pointers of the erase blocks after executing the sector write command.

At block 715, the filesystem can determine that the erase block is to be deleted by counting a number of pages of the erase block that are in the invalid state. At block 720, the filesystem can generate an erase block reset command to send to the solid state drive.

At block 725, the filesystem can receive a file rewrite request to modify the target file. At block 730, the filesystem can receive one or more updates to the write pointers of the erase blocks in the solid state drive. At block 735, the filesystem can select, based on the updates to the write pointers, another erase block to store at least a modified portion, as indicated by the file rewrite request, of the target file. For example, the filesystem can select the other erase block based on available memory space in each of the erase blocks, balance of valid and invalid pages in each of the erase blocks, presence of other portion of the target file in each of the erase blocks, or any combination thereof.

While processes or blocks are presented in a given order in flow charts of this disclosure, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation.

Some embodiments of the disclosure have other aspects, elements, features, and steps in addition to or in place of what is described above. These potential additions and replacements are described throughout the rest of the specification.

What is claimed is:

1. A computer-implemented method, comprising:
   receiving, by a filesystem of a host computer coupled to a solid state drive, a write pointer corresponding to a next available page of an erase block in the solid state drive;
   receiving, at the filesystem, a file write request to store a target file;
   determining a logical address range to store at least a portion of the target file based on the file write request and the write pointer; and
   generating a sector write command to send to the solid state drive, the sector write command specifying the determined logical address range.

2. The computer-implemented method of claim 1, wherein the file write request is generated by an application running on an operating system of the host computer.

3. The computer-implemented method of claim 1, wherein determining the logical address range includes determining a potential performance penalty associated with writing the at least a portion of the target file to the erase block.

4. The computer-implemented method of claim 3, wherein said determining the potential performance penalty includes detecting an inability to store the entirety of the target file into remaining available portion of the erase block.

5. The computer-implemented method of claim 3, wherein said determining the potential performance penalty includes determining that storing the at least a portion of the target file causes write amplification.

6. The computer-implemented method of claim 3, wherein said determining the potential performance penalty includes determining that storing the at least a portion of the target file causes a read-modify-write operation at the solid state drive.

7. The computer-implemented method of claim 1, further comprising tracking, by the filesystem, states of pages in the erase block.

8. The computer-implemented method of claim 7, wherein the states of the pages include at least an available state, an in-use state, and an invalid state, wherein the available state indicates that a page is available for data storage, the in-use state indicates that a page is storing valid data, and the invalid state indicates that a page is storing stale or incorrect data.

9. The computer-implemented method of claim 8, further comprising:
   determining that the erase block is to be deleted by counting a number of pages of the erase block in the invalid state; and
   generating an erase block reset command to send to the solid state drive.

10. The computer-implemented method of claim 1, further comprising tracking, by the filesystem, a state change of the erase block.

11. The computer-implemented method of claim 10, wherein the state change can specify a state from among potential states for the erase block, and wherein the potential states include at least an empty state, an in-use state, and a full state, wherein the empty state indicates that a write pointer associated with the erase block references a starting page of the erase block, the in-use state indicates that the write pointer references a page in the erase block other than the starting page, and the full state indicates that the erase block has a null write pointer.

12. The computer-implemented method of claim 1, further comprising:
   receiving write pointers to next available pages of erase blocks in the solid state drive;
   updating state information of the erase blocks; and
   selecting, based on the state information, one of the erase blocks as a destination for the at least a portion of the target file.

13. The computer-implemented method of claim 1, further comprising receiving, by the filesystem, a command rejection responsive to the sector write command when the logical address range does not begin with one of write pointers to next available pages of erase blocks in the solid state drive.

14. A non-transitory computer-readable data storage medium storing computer-executable instructions that, when executed, cause a host computer system coupled to a solid state drive to perform a computer-implemented method, the computer-executable instructions comprising:

instructions for receiving, by a filesystem of the host computer system, a write pointer from firmware of the solid state drive, wherein the write pointer references a next available page to an erase block in the solid state drive;

instructions for receiving, at the filesystem, a file write request to store a target file from an application;

instructions for determining a logical address range to store at least a portion of the target file based on the file write request and the write pointer; and instructions for generating a sector write command to send to the solid state drive, the sector write command specifying the determined logical address range.

15. The computer-readable data storage medium of claim 14, wherein the computer-executable instructions further comprises:

instructions for receiving a file rewrite request to modify the target file;

instructions for receiving one or more updates to write pointers of erase blocks in the solid state drive; and instructions for selecting, based on the updates to the write pointers, another erase block to store at least a modified portion, as indicated by the file rewrite request, of the target file.

16. The computer-readable data storage medium of claim 14, wherein the instructions for determining the logical address range includes instructions for selecting the erase block as a destination for the at least a portion of the target file and wherein the logical address range starts at the write pointer.

17. The computer-readable data storage medium of claim 14, wherein said receiving the write pointer from firmware of a solid state drive is responsive to sending a query command to the firmware for erase block information.

* * * * *